(12) United States Patent
Schenk et al.

(10) Patent No.: US 7,156,896 B2
(45) Date of Patent: Jan. 2, 2007

(54) SEPARATING TANK ASSEMBLY AND METHOD OF DRAINING SEPARATING TANK

(75) Inventors: Travis Schenk, Spearfish, SD (US); James Isaac Meyer, Spearfish, SD (US); Jeffrey Jochim, Belle Fourche, SD (US); Gary M. Hamilton, Rapid City, SD (US)

(73) Assignee: Ramvac Dental Products, Inc., Spearfish, SD (US)

( * ) Notice: Subject to any disclaimer, the term of this patent is extended or adjusted under 35 U.S.C. 154(b) by 20 days.

(21) Appl. No.: 10/837,675

(22) Filed: May 4, 2004

(65) Prior Publication Data

US 2005/0247642 A1 Nov. 10, 2005

(51) Int. Cl.
*A61C 17/00* (2006.01)
(52) U.S. Cl. .............................. 95/24; 96/168; 433/95
(58) Field of Classification Search .................. 95/157, 95/158, 168, 193, 24, 241, 266; 433/92, 433/95; 137/391, 395; 604/317–320
See application file for complete search history.

(56) References Cited

U.S. PATENT DOCUMENTS

| | | | | |
|---|---|---|---|---|
| 3,051,175 A | * | 8/1962 | Nugent | 604/65 |
| 3,870,483 A | * | 3/1975 | Ritzler | 96/197 |
| 4,097,381 A | * | 6/1978 | Ritzler | 210/259 |
| 4,580,978 A | * | 4/1986 | Motola et al. | 433/92 |
| 4,963,094 A | | 10/1990 | Meyer | |
| 5,017,135 A | * | 5/1991 | Meyer | 433/92 |
| 5,078,759 A | * | 1/1992 | Kira | 95/223 |
| 5,548,944 A | * | 8/1996 | Prochut et al. | 53/511 |
| 5,613,851 A | * | 3/1997 | Trawoger et al. | 433/92 |
| 5,879,552 A | * | 3/1999 | Bradfield | 210/411 |
| 6,179,904 B1 | | 1/2001 | Knowles et al. | |
| 6,379,149 B1 | | 4/2002 | Franetzki | |
| 2003/0003417 A1 | * | 1/2003 | Hubner et al. | 433/92 |

* cited by examiner

*Primary Examiner*—Frank M. Lawrence
(74) *Attorney, Agent, or Firm*—Nixon & Vanderhye P.C.

(57) ABSTRACT

A separating tank assembly enables a dental vacuum separating tank to be drained without using a pump and without turning off or isolating the vacuum source from the tank. A drain tank is provided in fluid communication with the separating tank, and a control valve controls a pressure differential between the drain tank and the fluid tank. When the separating tank is filling, the drain tank and separating tank pressures are equalized, and the tanks are in fluid communication. When the fluid in the drain tank reaches a predetermined level, the solenoid opens the drain tank to atmosphere, blocking fluid communication between the separating tank and the drain tank and opening fluid communication between the drain tank and a sewer drain. After the fluid is drained, the solenoid reopens fluid communication between the separating tank and the drain tank, and the pressures in the respective tanks are equalized.

11 Claims, 1 Drawing Sheet

SEPARATING TANK ASSEMBLY AND METHOD OF DRAINING SEPARATING TANK

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The present invention relates to a system and method for draining a fluid tank under constant vacuum pressure and, more particularly, to a drain tank attachable to a separating tank that enables the separating tank to be drained without disrupting the vacuum pressure in the separating tank.

Modern dental care facilities typically include multiple treatment rooms, each respectively connected to a central vacuum system. Dental aspirator tips are generally provided at each operatory for disposition in the patient's mouth to remove aerosols, liquids, solid debris and odors. Some types of dental vacuum producers are not meant to come in contact with the liquid and solid debris, and therefore a means of separation is necessary. The most common means is to use a separation tank. Typically, a separation tank uses gravity and a reduced flow velocity as its primary means of separation. Separating tanks are drained either by a draining device such as a pump to remove the tank contents against the vacuum head, or more commonly by removing vacuum from the tank. The vacuum can be removed from the tank either by shutting the vacuum source off or by isolating the tank from the vacuum source.

BRIEF SUMMARY OF THE INVENTION

It would thus be desirable for a system and method to drain a separating tank without using a pump and without requiring isolating the vacuum source from the tank. Additionally, it would be desirable to effect draining of the tank without interrupting vacuum service.

In an exemplary embodiment of the invention, a separating tank assembly is provided for a dental vacuum system. The separating tank assembly includes a separating tank connected to a vacuum pump, where the separating tank has an inlet for liquid and solid debris. A drain tank is in fluid communication with the separating tank via an outlet and an intermediate check valve. A control valve is secured to the drain tank and coupled with the separating tank via a tube, where the control valve selectively opens the drain tank (1) to the separating tank via the tube and (2) to atmosphere. A level sensor disposed in the drain tank supplies a level signal to the control valve. A sewer drain is disposed in fluid communication with the drain tank via a drain check valve. Vacuum pressure in the separating tank and the drain tank maintains the intermediate check valve in an open position, enabling fluid communication between the separating tank and the drain tank. Additionally, vacuum pressure in the separating tank and the drain tank maintains the drain check valve in a closed position, blocking fluid communication between the drain tank and the sewer drain. When the level sensor detects that a predetermined level in the drain tank has been reached, the control valve opens the drain tank to atmosphere, wherein a pressure differential between the separating tank and the drain tank causes the intermediate check valve to close and the drain check valve to open.

The level sensor may include a high level sensor and a low level sensor, where the high level sensor indicates that the predetermined level in the drain tank has been reached, and the low level sensor signals the control valve to reopen the drain tank to the separating tank. In one arrangement, the level sensor is a non-contact capacitive type sensor, and in an alternative, the level sensor is a mechanical float type sensor. In another arrangement, the sensor is a non-contact variable voltage sensor that may include structure for self-adjusting target voltages to accommodate contamination on the drain tank inside wall.

In another exemplary embodiment of the invention, a drain tank is attachable to a fluid tank under constant vacuum pressure. The drain tank is configured to drain the fluid tank without disrupting the vacuum pressure in the fluid tank. In this context, the drain tank may be configured to drain the fluid tank without disrupting the vacuum pressure in the fluid tank without using a pump. The tank may additionally include a control valve for controlling a pressure differential between the drain tank and the fluid tank.

The invention may also be embodied in a plurality of the separating tank assemblies of the invention for a dental vacuum system serving each of a plurality of treatment rooms in a dental facility, respectively. In this context, each of the separating tanks is connected to a central vacuum pump system.

In yet another exemplary embodiment of the invention, a method of draining a fluid tank under constant vacuum pressure without disrupting the vacuum pressure is provided. The method utilizes a drain tank in fluid communication with the fluid tank via an outlet and an intermediate check valve, where the drain tank is in fluid communication with a sewer drain via a drain check valve. The method includes the steps of (a) detecting a fluid level in at least one of the fluid tank and the drain tank; (b) maintaining the intermediate check valve in an open position by vacuum pressure in the fluid tank and the drain tank, thereby enabling fluid communication between the fluid tank and the drain tank; (c) maintaining the drain check valve in a closed position by vacuum pressure in the fluid tank and the drain tank, thereby blocking fluid communication between the drain tank and the sewer drain; and (d) when the fluid level in at least one of the fluid tank and the drain tank has reached a predetermined high level, the step of opening the drain tank to atmosphere such that a pressure differential between the fluid tank and the drain tank causes the intermediate check valve to close and the drain check valve to open. In this context, after step (d), when the fluid level in the drain tank has reached a predetermined low level, the method may additionally include the step of (e) closing the drain tank to atmosphere and reopening the drain tank to the fluid tank. Steps (d) and (e) may be practiced using a control valve attached to the drain tank.

In still another exemplary embodiment of the invention, a method of operating a dental vacuum system is provided where the system includes a plurality of separating tanks connected to a central vacuum pump system, and a corresponding plurality of drain tanks each in selective fluid communication with a respective one of the separating tanks. The method includes using the drain tank to drain the separating tank without disrupting a vacuum pressure in the separating tank.

BRIEF DESCRIPTION OF THE DRAWINGS

These and other aspects and advantages of the present invention will be described in detail with reference to the accompanying drawing, in which.

DETAILED DESCRIPTION OF THE INVENTION

Figure 1:
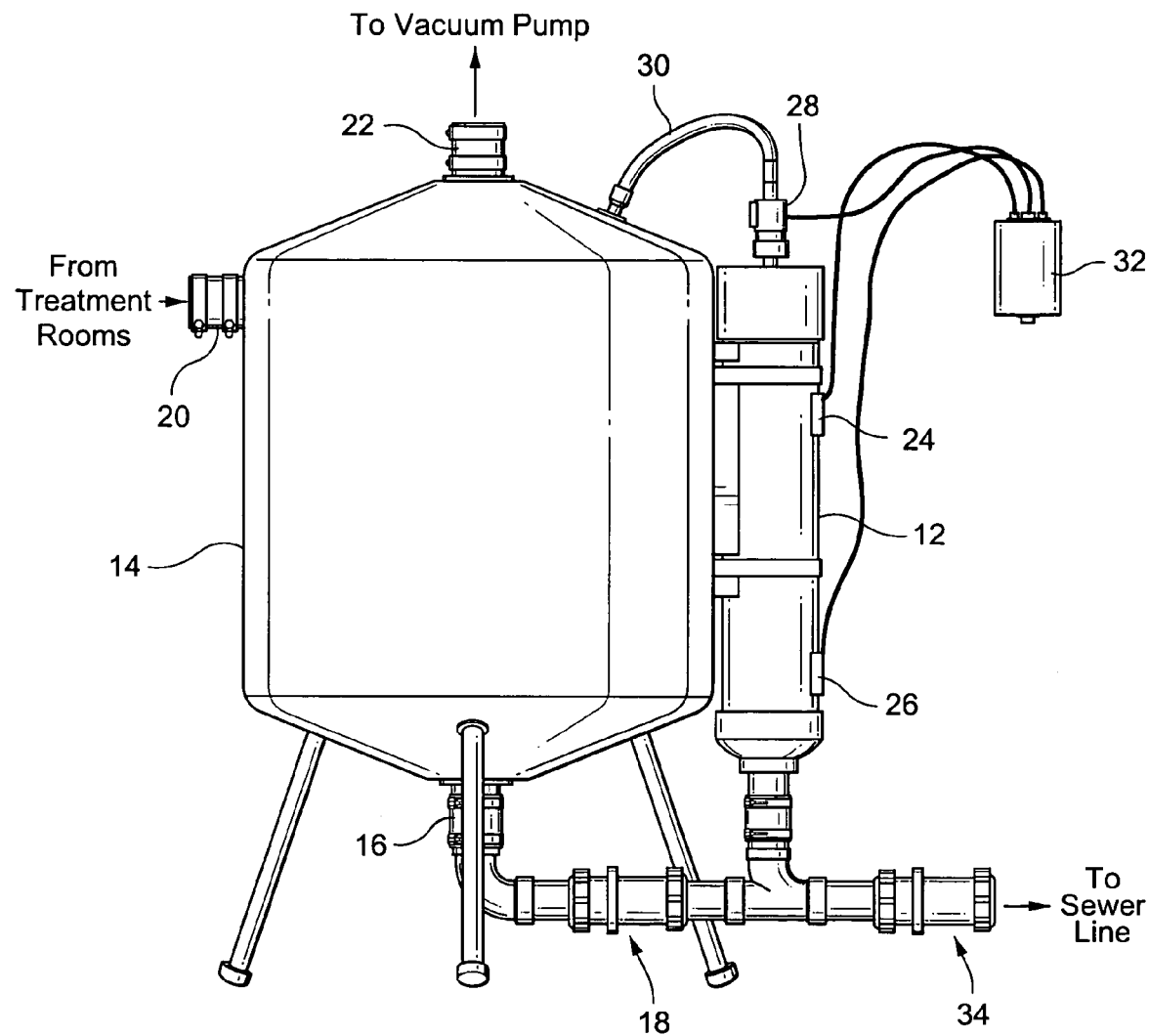
FIG. 1 illustrates the system according to the present invention.

With reference to FIG. 1, the system includes a drain tank 12 connected to an outlet 16 of a separating tank 14 via an intermediate check valve 18. The separating tank 14 also includes an inlet 20 for liquid and solid debris from one or more treatment rooms and a connection 22 to a vacuum pump.

The drain tank 12 is preferably fitted with one or more level sensors for determining a fluid level in the drain tank 12. In a preferred arrangement, the drain tank 12 includes a high level sensor 24 and a low level sensor 26. A control valve 28, such as a solenoid valve, is mounted on top of the drain tank 12 by solid or flexible fittings and is connected to the separating tank 14 by a tube 30. Actuation of the control valve 28 may be effected via mechanical means, air, vacuum, and the like, and the invention is not necessarily meant to be limited to the described exemplary application. A controller 32 receives input from the high level sensor 24 and the low level sensor 26 and controls a position of the control valve 28 via a relay or the like. A drain check valve 34 is disposed between the drain tank 12 and a sewer drain.

In operation, the control valve 28 ports the separating tank 14 and the drain tank 12 via an open intermediate check valve 18 such that the pressure in the drain tank 12 and the separating tank 14 are equalized. This equal pressure on both sides of the intermediate check valve 18 allows liquids to flow from the separating tank 14 to the drain tank 12 and maintains an equal fluid column height in both tanks. Vacuum pressure in the separating tank 14 and the drain tank 12 maintains the intermediate check valve 18 in its open position. Additionally, the vacuum pressure in the separating tank 14 and the drain tank 12 maintains the drain check valve 34 in a closed position, thereby blocking fluid communication between the drain tank 12 and the sewer drain.

When the fluid level in the drain tank 12 rises to the high level sensor 24, a sensor switch closes, signaling the controller 32 to energize the control valve 28 and power the lower level sensor 26. With liquid at the lower level sensor 26, the lower sensor 26 is also closed. The controller 32 will provide power to the control valve 28 and the lower level sensor 26 as long as the lower level sensor 26 is closed.

When activated, the control valve 28 vents the drain tank 12 to atmosphere such that a pressure differential between the separating tank 14 and the drain tank 12 causes the intermediate check valve 18 to close and the drain check valve 34 to open. The contents of the drain tank 12 are then emptied to the sewer drain. With the intermediate check valve 18 closed, vacuum pressure in the separating tank 14 is uninterrupted. When the low level sensor 26 determines that a predetermined low level in the drain tank 12 has been reached, the controller 32 returns the control valve 28 to its normal position to reopen the drain tank 12 to the separating tank 14. Any air in the drain tank 12 is then evacuated through the vent tube 30 into the separating tank 14 and through the outlet 22 to the vacuum pump. Subsequently, the pressure in the drain tank 12 equalizes with the separating tank 14, thereby closing the drain check valve 34 and opening the intermediate check valve 18 to allow fluid to again pass from the separating tank 14 to the drain tank 12 via the intermediate check valve 18.

The drain cycle may also be actuated before the fluid level reaches the high level sensor 24 via a switch or the like.

The control valve 28 is generally of known structure and details of its construction and operation will not be further described. One suitable control valve is available from Evolutionary Concepts, Inc. of San Dimas, Calif. The control valve 28 may be a three-way valve with two positions and a common port; or alternatively, the control valve 28 may comprise two two-way (on/off) valves, with one plumbed between the separator tank 14 and the drain tank 12, which is opened at start-up, and the second plumbed from the drain tank 12 to atmosphere, which is closed at start-up. The two valves would alternate states when the drain cycle is initiated. Similarly, the intermediate check valve 18 and the drain check valve 34 are generally of known construction and any suitable check valves selectively controllable via a pressure differential can be used. Suitable check valves are available from Flo Controls, Inc. of Burbank, Calif.

The high level sensor 24 and the low level sensor 26 are shown in FIG. 1 as non-contact capacitive type sensors mounted outside of the drain tank 12. The structure and operation of such sensors are also known, and details thereof will not be further described. Suitable sensors are available from Turck, Inc. of Minneapolis, Minn. Alternatively, the sensors could be mechanical float type sensors, resistance sensors, optical sensors, and the like for detecting fluid levels in the tank 12. The level sensors 24, 26 and control components may be with or without status indicators. Additionally, the control components may be electromechanical or solid state electrical components as would be apparent to those of ordinary skill in the art.

Yet another suitable sensor is a non-contact sensor that produces a variable voltage in proportion to the presence of water and/or contamination inside the tank. One such sensor is also available from Turck, Inc., model #BC10-S30-Y1X. In this context, the controller 32 may include a programmable microchip and a relay to control the solenoid valve 28. The sensor voltage is sent to the microchip, which includes an analog to digital converter to convert the sensor voltage to digital data. The voltage level is used to determine whether the water level is at the sensor or not. The microchip in-turn controls the controller/relay 32.

The chip monitors the sensor voltages. When the high level sensor has water present, the chip will command the controller or relay to activate the solenoid valve (opening the drain tank to atmosphere) and start the drain cycle. When the low level sensor indicates no water, the drain cycle is terminated by shifting the solenoid back (connecting the drain tank to vacuum).

Contamination on the walls of the drain tank may affect the sensor voltage. Enough contamination could appear to be water at the sensor. By changing the voltage target number, the contamination on the tank wall can be "tuned out." This could be an automatic feature. The control logic could monitor high and low voltage history for both sensors. Either by pushbutton from an operator or periodically on its own, the microchip could adjust sensor target voltages to tune-out contamination.

The drain tank 12 may be constructed as a stand-alone unit with a dedicated separating tank 14 or may alternatively be attached to an existing standard separating tank. The drain tank may be formed of any suitable material and is preferably formed of polyvinyl chloride (PVC) plastic tubing and may be transparent, translucent or opaque. Additionally, the drain tank 12 may be mounted in other configurations than that shown in FIG. 1, such as beneath the separating tank 14.

With the assembly of the present invention, significant space savings can be achieved by eliminating large storage tanks. Additionally, control is effected with clean air to minimize exposure of contaminants to control components. The system is efficient in that the only flow loss results from the need to evacuate the air that is vented into the drain tank while draining; otherwise, there is no pressure loss associated with the assembly. Still further, control valves and sensors are located away from potential contaminants. The unit also achieves fail safe operation where if the unit does not operate correctly, the separating tank will operate as normal until enough material is collected to fill its volume in which case it will overflow into the vacuum unit triggering an existing moisture alarm to turn the unit off.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A separating tank assembly for a dental vacuum system, the separating tank assembly comprising:
    a separating tank connected to a vacuum pump, the separating tank having an inlet for liquid and solid debris; and
    a drain tank in fluid communication with the separating tank via an outlet and an intermediate check valve;
    a control valve secured to the drain tank and coupled with the separating tank via a tube, the control valve selectively opening the drain tank (1) to the separating tank via the tube and (2) to atmosphere;
    a level sensor disposed in the drain tank, the level sensor supplying a level signal to the control valve; and
    a sewer drain in fluid communication with the drain tank via a drain check valve,
    wherein vacuum pressure in the separating tank and the drain tank maintains the intermediate check valve in an open position enabling fluid communication between the separating tank and the drain tank, and wherein vacuum pressure in the separating tank and the drain tank maintains the drain check valve in a closed position blocking fluid communication between the drain tank and the sewer drain,
    wherein when the level sensor detects that a predetermined level in the drain tank has been reached, the control valve opens the drain tank to atmosphere such that a pressure differential between the separating tank and the drain tank causes the intermediate check valve to close and the drain check valve to open.

2. A separating tank assembly according to claim 1, wherein the level sensor comprises a high level sensor and a low level sensor, the high level sensor indicating that the predetermined level in the drain tank has been reached, and the low level sensor signaling the control valve to reopen the drain tank to the separating tank.

3. A separating tank assembly according to claim 1, wherein the level sensor comprises a non-contact capacitive type sensor.

4. A separating tank assembly according to claim 1, wherein the level sensor comprises a mechanical float type sensor.

5. A separating tank assembly according to claim 1, wherein the level sensor comprises a non-contact variable voltage sensor.

6. A separating tank assembly according to claim 5, wherein the non-contact variable voltage sensor comprises means for self-adjusting target voltages to accommodate contamination on the drain tank inside wall.

7. A method of draining a fluid tank under constant vacuum pressure without disrupting the vacuum pressure using a drain tank in fluid communication with the fluid tank via an outlet and an intermediate check valve, the drain tank being in fluid communication with a sewer drain via a drain check valve, the method comprising:
    (a) detecting a fluid level in at least one of the fluid tank and the drain tank;
    (b) maintaining the intermediate check valve in an open position by vacuum pressure in the fluid tank and the drain tank, thereby enabling fluid communication between the fluid tank and the drain tank;
    (c) maintaining the drain check valve in a closed position by vacuum pressure in the fluid tank and the drain tank, thereby blocking fluid communication between the drain tank and the sewer drain; and
    (d) when the fluid level in at least one of the fluid tank and the drain tank has reached a predetermined high level, the method comprising opening the drain tank to atmosphere such that a pressure differential between the fluid tank and the drain tank causes the intermediate check valve to close and the drain check valve to open.

8. A method according to claim 7, wherein after step (d), when the fluid level in the drain tank has reached a predetermined low level, the method comprising (e) closing the drain tank to atmosphere and reopening the drain tank to the fluid tank.

9. A method according to claim 8, wherein steps (d) and (e) are practiced using a control valve attached to the drain tank.

10. A method of operating a dental vacuum system including a plurality of separating tanks connected to a central vacuum pump system, and a corresponding plurality of drain tanks each in selective fluid communication with a respective one of the separating tanks, the method comprising using the drain tank to drain the separating tank without disrupting a vacuum pressure in the separating tank by maintaining an equal pressure in the separating tank and the drain tank while enabling fluid communication between the separating tank and the drain tank, wherein when a fluid level in at least one of the separating tank and the drain tank reaches a predetermined high level, the method comprises preventing fluid communication between the separating tank and the drain tank and opening the drain tank to atmosphere.

11. A method according to claim 10, wherein after preventing fluid communication between the separating tank and the drain tank, when the fluid level in at least one of the separating tank and the drain tank reaches a predetermined low level, the method comprises closing the drain tank from atmosphere, and permitting fluid communication between the separating tank and the drain tank.

* * * * *